March 10, 1970 J. E. HATFIELD 3,499,193
PUSHBUTTON SAFETY SEAT BELT BUCKLE
Filed Feb. 9, 1968 2 Sheets-Sheet 1
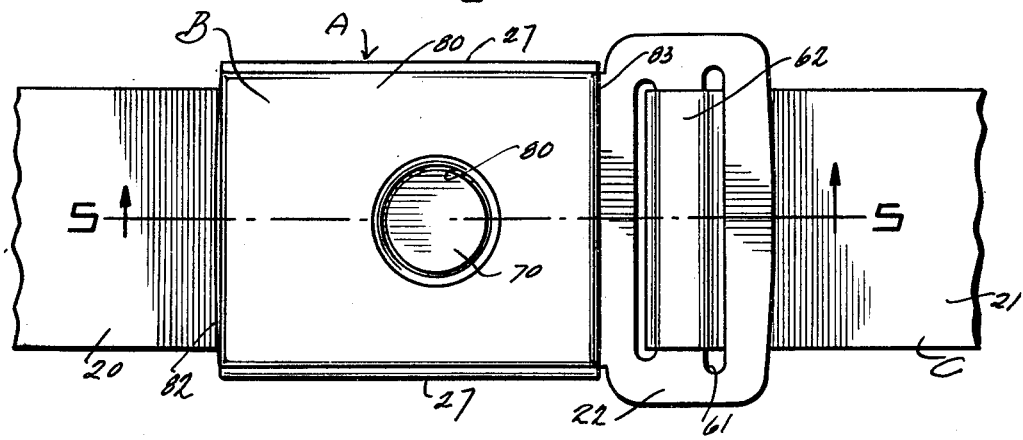
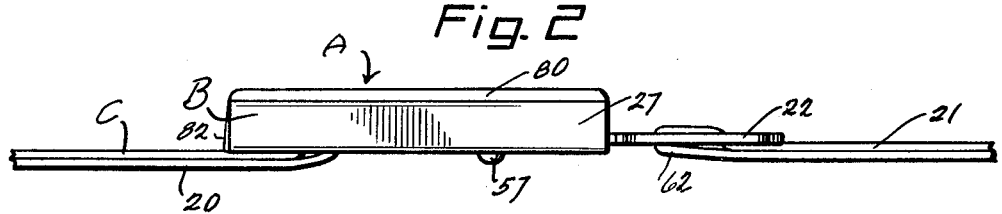
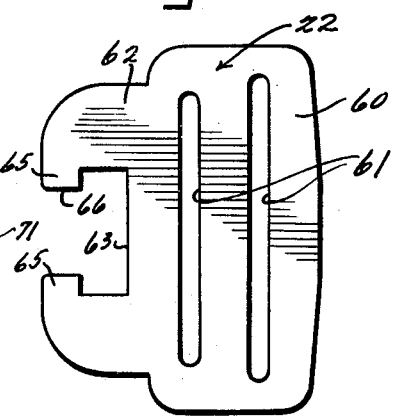
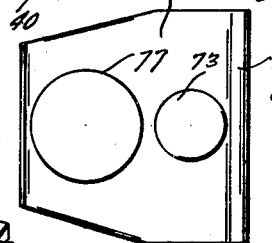
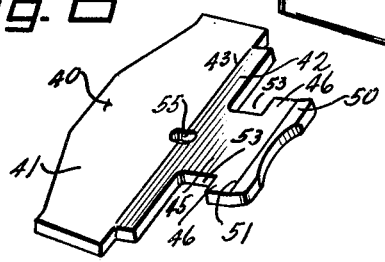
INVENTOR
John Edward Hatfield
BY
ATTORNEYS March 10, 1970    J. E. HATFIELD    3,499,193
PUSHBUTTON SAFETY SEAT BELT BUCKLE
Filed Feb. 9, 1968    2 Sheets-Sheet 2

INVENTOR
John Edward Hatfield
BY
ATTORNEYS

United States Patent Office 3,499,193
Patented Mar. 10, 1970

3,499,193
PUSHBUTTON SAFETY SEAT BELT BUCKLE
John Edward Hatfield, Stotfold, England, assignor to Irvin Industries Inc., Lexington, Ky., a corporation of New York
Filed Feb. 9, 1968, Ser. No. 704,355
Claims priority, application Great Britain, June 20, 1967, 28,495/67
Int. Cl. A44b *11/26*
U.S. Cl. 24—230       8 Claims

ABSTRACT OF THE DISCLOSURE

A safety seat belt buckle of relatively simple and sturdy construction which is of the pushbutton type, including improved interconnecting tongue and latching dog features, and a latching dog mounted for rocking action. A compact biasing spring is provided adapted to normally position the dog in latching position and an operating member in pushbutton position.

---

This invention relates to improvements in safety seat belt buckles.

The primary object of this invention is the provision of a relatively simple and durable safety seat belt buckle, of the pushbutton type, having an improved release means adapted to eliminate the inherent disadvantages of conventional lift the lid type of safety belt buckles.

A further object of this invention is the provision of a pushbutton buckle for safety belts which satisfies the safety requirements of release under load, and which is relatively cheap to manufacture and simple and safe to operate.

A further object of this invention is the provision of a pushbutton type of vehicle safety belt buckle including a casing for a latching dog and provided with means for adjustable attachment of a seat belt thereto, and a latching tongue having means for attachment of seat belt webbing thereto, and in which the casing and latching tongue are provided with improved means for interconnection of the tongue and latching dog.

A further object of this invention is the provision of an improved spring means for safety belt buckles which is compactly mounted in such relation to a pushbutton member of the buckle and a latching dog as to provide for very effective spring biasing action.

In the accompanying drawings formally part of this specification and wherein similar reference characters designate corresponding parts throughout the several views:

FIG. 1 is a top plan view of the interconnected parts of the improved safety buckle and belt parts.

FIG. 2 is a side elevation of the details shown in FIG. 1.

FIG. 3 is a front elevation of the main buckle part showing associated details thereof, and an entrance way for a latching tongue.

FIG. 4 is a plan view of an improved type of latching tongue.

FIG. 8 is a perspective view of the latching dog.

FIG. 12 is a plan view of the latching dog actuating member.

Figure 5:
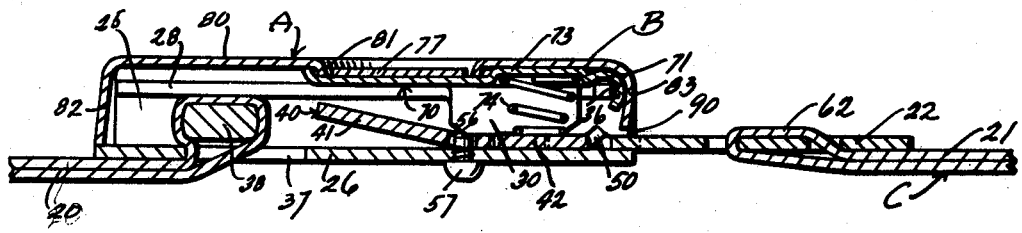
FIG. 5 is a longitudinal cross sectional view taken through the belt webbing and buckle parts of the safety seat buckle construction, substantially on the line 5—5 of FIG. 1, and showing more particularly the belt parts in interconnected latched relation.

In the drawings wherein for the purpose of illustration is shown a preferred embodiment of the invention, the letter A may generally designate the improved safety seat belt assembly. It includes a buckle construction B and a belt webbing C.

The belt construction C preferably includes an end portion 20 which is adapted to be adjustably connected directly to the buckle construction B, and a tongue attaching portion 22 at the opposite end of the belt, the latter being adapted to be attached to the buckle.

Referring to the buckle construction B the same is made of relatively simple stamped metal parts, bent to formation. Its casing includes a main body portion 25, shown in plan view in FIG. 7 and cross sectional view in FIG. 9. This body portion 25 includes a flat rigid base 56 of somewhat rectangular formation, along the side margins of which are upstanding walls 27 of the same formation, each of which is provided with a lateral inwardly extending overhanging flange 28. The flanges 28 may be notched at their rear ends 29 and near their front ends are provided with internal depending flanges 30 in spaced relation to the upstanding walls 27. The flanges 30 at their lower rear ends are provided with stop projections 31 intended to limit forward action of the latching dog, as will be subsequently described.

At their front ends the side walls 27 are each provided with inwardly projecting prong-like members 33 which at their free ends are forwardly notched at 35 to provide short hinge projecting portions upon which a pushbutton actuating member is pivotally mounted for operation of a latching dog.

As is well understood in the art, base 26 is provided with a transverse opening 37, adapted to receive therethrough a looped adjusting end of the belt webbing portion 20, which at the rear of the buckle is looped around a rigid retaining bar 38 which slides in the casing above the opening 37. The bar 38 is located at its ends between the base 26 and flanges 28 for slidable retention action.

The buckle construction B is provided with a latching dog 40, of stamped sheet metal. It includes a main flat plate portion 41 and a tongue latching portion 42 bent upwardly at a slight angle with respect to the plane of the portion 41 along a line 43; the angle between the parts 41 and 42 being clearly shown in the views of FIGS. 5 and 6 and being less than 180 degrees.

Figure 6:
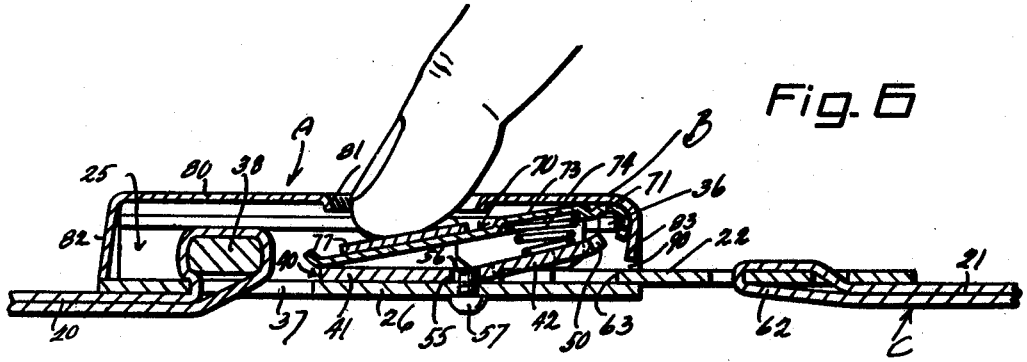
FIG. 6 is a cross sectional view of the parts shown in FIG. 5, but showing how an operator pushes a pushbutton member for the purpose of releasing a belt webbing tongue.
Figure 7:
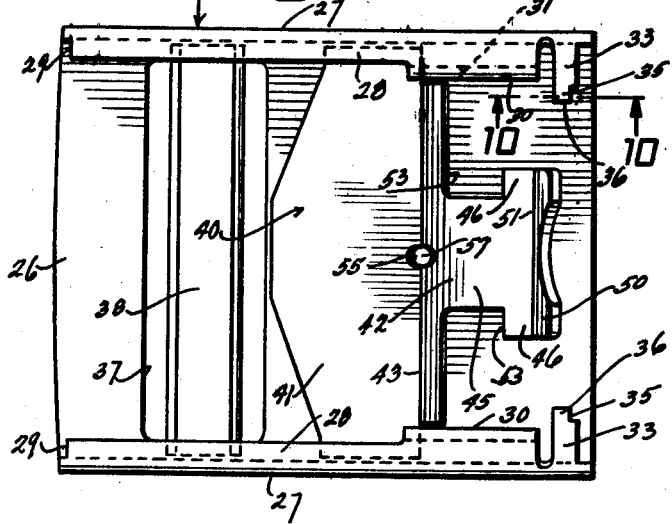
FIG. 7 is a plan view of the body portion of the main buckle casing, showing a latching dog mounted therein.
Figure 10:
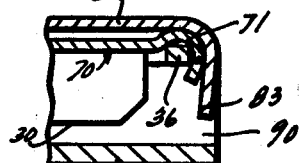
FIG. 10 is a fragmentary cross sectional view taken substantially on the line 10—10 of FIG. 7, but additionally showing a pushbutton mounting means and a cover for the main body casing.

The latching portion 42 of the dog 40 includes a forwardly and upwardly extending narrow neck portion 45. The neck portion 41 at its forward end is provided with opposed lateral latching extensions 46 projecting in right angled relation with respect to the neck 42, as shown in FIGS. 7 and 8. The projections 46 and the connection between the same is provided with a forwardly and upwardly angled portion 50 which is bent upwardly along line 51 out of the plane of the extensions 46 and the neck 42, as is shown in FIGS. 5 and 6 of the drawings, for a purpose to be subsequently described. With this construction it will be noted that there are locking recesses 53 located between the extensions 46 and the rear portion of the upwardly angled part 42 of the latching dog. The latching dog 40 midway between the sides thereof and intersecting the point of the line of angling of the parts 41 and 42 is provided with an elongated slot 55 which extends lengthwise of the buckle and is adapted to receive the shank portion 56 of a restraining and pivot screw 57. The latter is screw fitted in an opening through the base wall 26 of the casing, as shown in FIGS. 5 and 6. This shank 56 is adapted to be disposed in the slot 55 of the latching dog in order that the latching dog may have a limited amplitude of movement fore and aft in the casing B.

Figure 9:
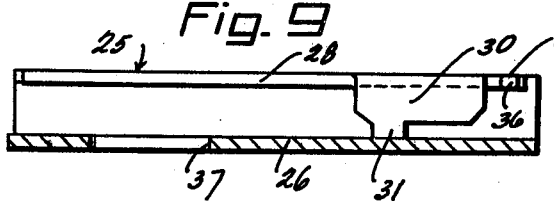
FIG. 9 is a longitudinal cross sectional view taken through the main body of the buckle casing.

It will be noted that the side margins of the plate portions 41 of the latching dog 40 are extended into the recesses between the base wall 26 and the overhanging flanges 28. The forward amplitude of movement of the ends of the plate 41 is limited by the projecting parts 31 of the casing body 25 as is shown in FIGS. 7 and 9 of the drawings.

Referring to the tongue plate 22, shown in FIG. 4, the body portion 60 thereof is provided with a pair of tranverse slots 61 in parallel relation adapted to receive the looped end 62 of the belt webbing 21. It may be permanently stitched in this position or otherwise secured. The tongue 22 furthermore includes the attaching portion 62 provided with a T-shaped socket 63 therein formed to receive the T-shaped latching head of the latching dog 40. The T-shaped socket 63 is formed by extensions 65 defining a narrowed portion of the T-shaped socket 63. These extensions define an entrance 66 for the dog neck. The tongue 22 is entirely flat and can be inserted in the front end of the casing construction to engage beneath the angled portion 50 of dog 40 and lift the forward end of the latching dog in order that the tongue may be inserted in the casing to the point where the T-shaped head of the latching dog will fall into the T-shaped opening 63 of the tongue, for latching the tongue 22 to the buckle latching dog 40 in the position shown in FIG. 5, and thus encircling the belt upon a wearer.

Referring to the operating means for actuating the dog 40 into a released position, a lever type member 70 is provided, of rather flat shape having a downwardly curved segmental shaped margin 71 adapted to fit over and receive the prong extensions 36 of the casing and thus pivotally mounting this operating member 70 in a position to be depressed at its rear end for rocking the latching dog to a released position, as shown in FIG. 6. This member 70 is provided with an under socketed portion 73 adapted to receive the upper larger diametered end of a compressed tapered telescopic type spiral spring 74; the lower end of which rests upon the angled portion 42 of the latching dog, as shown in FIGS. 5 and 6. The notches 35 hold the operating member 70 in position against lateral sliding. The top surface of the operating member is provided with a pushbutton disc 77 adapted to be engaged by an operator as shown in FIG. 6.

The casing B includes a cover 80 preferably of stamped sheet metal having a rear depending wall 82 and forward depending wall 83. They may be slightly inturned for the purpose of snapping the cover into place on the body 25. The cover is provided with an opening 81 therein into which a finger of an operator may be inserted for depressing the operating member 70 in order to release the tongue 22 from the latching dog 40. It should be noted that the top of the cover and the front end 83 overlie the segmental shaped portion 71 of the operating member 70 and holds the same in place. The entire pivotal action is furnished by the extensions 36 of the casing body 35.

To summarize the action of the various parts, the latching dog normally lies in the position shown in FIG. 5. The tongue 22 is inserted through the opening 90 at the front of the casing. The inserting end of the tongue engages the inclined portion 50 of the latching dog and continued pressure will lift the dog to enable the tongue to be fully inserted; at which time the spiral spring 74 will urge the latching dog downwardly to socket the T-shaped latching dog extension 42 in the socket opening 63 of the tongue and thus effect latching of the tongue upon the buckle casing.

In order to release the tongue it is merely necessary for the operator to insert a finger, as shown in FIG. 6, and depress the operating member 70 to the position shown, at which time the operating member at its rear end will engage the upwarding and rearwardly inclined end of the latching lever, and rock the latching dog to the position shown in FIG. 6 to enable withdrawal of the belt tongue 22.

Figure 11:
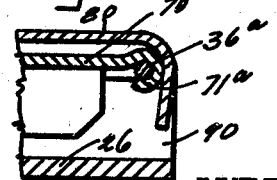
FIG. 11 is a modified form of means for snap attachment of a pushbutton lever on mounting prongs of the buckle casing body, showing how the pushbutton is pivotally mounted thereon.

In order to pivotally mount the operating member 7ª in a definitely secured relation upon the prongs 36ª, as shown in FIG. 11, said prongs 36ª may be made circular in cross section and the segmental portion 71ª of the operating member may be sufficiently resilient that it can be snapped onto the extensions 36ª to the posiiton shown in FIG. 11.

By way of example the parts may be formed of plastic or other materials if found suitable.

Various changes in the shape, size, and arrangement of parts may be made to the form of invention here shown and described, without departing from the spirit of the invention or the scope of the claims.

I claim:

1. In a safety belt buckle construction, the combination of a casing including a base wall and upstanding relatively spaced side walls connected therewith and a cover mounted on said side walls, said casing having a chamber therein, the cover having an opening to said chamber, a latching dog pivotally engaging the top surface of said base wall in the chamber, a separate dog actuating member movably mounted within the casing chamber, spring means biasing both said operating member to normally cover the opening and actuating the dog into a normal latching position, a belt attaching tongue, said latching dog having an endwise projecting T-shaped latching head thereon and the tongue having a T-shaped socket therein to receive the latching head so that the T-shaped latching dog and tongue will lie flush in the same plane therewith in latched position.

2. The safety belt construction as defined in claim 1 in which the latching dog is pivotally mounted upon said casing and includes an end portion at the rear of its pivot movable when depressed to overlie the base in parallelism therewith and which dog also has an upwardly and normally forwardly angled portion which the tongue upon insertion into the casing engages at the under side thereof to lift the said end portion of the dog until the tongue is inserted into the casing a sufficient distance to enable the T-shaped latching head, under the influence of said biasing spring, to move into the tongue socket in latched condition.

3. In a safety belt buckle construction the combination of a base wall having upstanding relatively spaced side walls and a cover on the upper margins of the side walls having an opening therein, a latching dog plate including a rear portion and a forward latching head, said rear portion and latching head being angled at less than 180° whereby the latching head normally is raised from the base when the rear portion lies on the base, an operating member pivotally mounted on the forward end of the casing beneath the cover, and a spiral spring compressed between the operating member and the latching head to normally urge the operating member to close said opening and the head portion to move into latching position whereby the rear portion may be engaged by the operating member as it is depressed through said cover opening for lifting the latching head to a release position.

4. A safety belt buckle construction comprising a casing including a base wall and upstanding relatively spaced side walls and a cover defining a chamber, said cover having an opening to said chamber, a latching dog movably mounted in the casing, including a rear portion and a front portion which are relatively disposed in angular relation of less than 180° and in which the latching dog is pivotally mounted directly on the base wall, an operating member movably mounted within the casing, spring means biasing said operating member to normally cover the opening and to actuate the dog into a latching position, a belt attaching tongue, means on the tongue and latching dog for releasable engagment under the influence of said biasing spring, the pivotal mounting of the latching dog consisting of the socket opening in the latching dog at the juncture of the front and rear portions, and the base of the casing having a pivot member extending into said socket opening for rocking action of the angle portions of said latching dog.

5. In a safety belt buckle construction the combination of a casing having a base wall with upstanding relatively spaced side walls and a cover on said side walls having an opening therein, the said walls and cover defining a chamber, a latching dog consisting of a rear portion and a forward latching head, said portions being angled at less than 180°, projection means mounted on the bottom wall engaging the juncture of the rear portion and latching head of the latching dog plate whereby the latching dog plate may rock fore and aft on its pivot, on the top surface of said bottom wall an operating member movably mounted in the chamber, spring means normally under compression in the chamber to normally urge the operating member to a closed position over the opening of the cover and urging the head portion of the latching dog plate into latching position, said operating member upon manual depression being adapted to engage the rear portion of the latching dog plate and rock it for lifting the latching head to a release position.

6. The buckle of claim 5 in which the rocking means for the latching dog consist of a rigid pin extending from the bottom wall and the rocking location of the latching dog has a fore and aft elongated slot into which the pin extends.

7. In a safety belt construction, the combination of a casing having a base wall, upstanding side walls, a cover wall having a top opening therein, said walls defining a chamber, a latching dog plate pivotally mounted on the base wall of the casing intermediate its ends comprising a rear operating portion and a forward latching head which are relatively angled at less than 180°, a lever type operating member pivoted on said casing at the front thereof including a rear portion adapted to close the top opening of the cover, a spring under compression located between said operating member and the latching head biased to normally close the operating member over said opening and to move the latching head into latching position, said casing having a belt tongue inserting opening forwardly therein for insertion of a belt tongue into latching position with respect to the latching head.

8. The safety belt buckle construction defined in claim 7 to which the spring consists of a telescopic collapsible type spiral tapered spring.

References Cited

UNITED STATES PATENTS

| 3,270,388 | 9/1966 | Humphrey. |
| 3,317,970 | 5/1967 | Van Noord. |
| 3,345,712 | 10/1967 | Smith. |
| 3,396,437 | 8/1968 | Burleigh. |
| 3,427,694 | 2/1969 | Bullock. |

FOREIGN PATENTS

| 1,490,780 | 6/1967 | France. |

BERNARD A. GELAK, Primary Examiner